United States Patent
Wu et al.

(10) Patent No.: US 11,593,613 B2
(45) Date of Patent: Feb. 28, 2023

(54) CONVERSATIONAL RELEVANCE MODELING USING CONVOLUTIONAL NEURAL NETWORK

(71) Applicant: MICROSOFT TECHNOLOGY LICENSING, LLC, Redmond, WA (US)

(72) Inventors: Bowen Wu, Redmond, WA (US); Baoxun Wang, Redmond, WA (US); Shuang Peng, Redmond, WA (US); Min Zeng, Redmond, WA (US); Li Zhou, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 546 days.

(21) Appl. No.: 16/316,095

(22) PCT Filed: Jul. 4, 2017

(86) PCT No.: PCT/US2017/040626
§ 371 (c)(1),
(2) Date: Jan. 8, 2019

(87) PCT Pub. No.: WO2018/009490
PCT Pub. Date: Jan. 11, 2018

(65) Prior Publication Data
US 2021/0312260 A1    Oct. 7, 2021

(30) Foreign Application Priority Data
Jul. 8, 2016  (CN) .......................... 201610534215.0

(51) Int. Cl.
*G06N 3/04* (2006.01)
*G06F 40/30* (2020.01)
(Continued)

(52) U.S. Cl.
CPC .......... *G06N 3/0454* (2013.01); *G06F 40/30* (2020.01); *G06N 3/084* (2013.01)

(58) Field of Classification Search
CPC .... G06N 3/0454; G06N 3/084; G06N 3/0472; G06N 3/0445; G06N 3/08; G06N 3/04;
(Continued)

(56) References Cited

U.S. PATENT DOCUMENTS

2009/0204605 A1   8/2009   Bai et al.
2011/0238409 A1   9/2011   Larcheveque et al.
(Continued)

FOREIGN PATENT DOCUMENTS

| CN | 101566998 A | 10/2009 |
|----|-------------|---------|
| CN | 105574133 A | 5/2016 |
| WO | 2016/054779 A1 | 4/2016 |

OTHER PUBLICATIONS

International Search Report and Written Opinion for PCT/US2017/040626, dated Sep. 29, 2017.
(Continued)

*Primary Examiner* — Mouloucoulaye Inoussa
(74) *Attorney, Agent, or Firm* — Newport IP, LLC; Leonard J. Hope

(57) ABSTRACT

Non-limiting examples of the present disclosure describe a convolutional neural network (CNN) architecture configured to evaluate conversational relevance of query-response pairs. A CNN model is provided that can include a first branch, a second branch, and multilayer perceptron (MLP) layers. The first branch includes convolutional layers with dynamic pooling to process a query. The second branch includes convolutional layers with dynamic pooling to process candidate responses for the query. The query and the candidate responses are processed in parallel using the CNN (Continued)

model. The MLP layers are configured to rank query-response pairs based on conversational relevance.

20 Claims, 6 Drawing Sheets

(51) Int. Cl.
*G06N 3/08* (2006.01)
*G06N 3/084* (2023.01)

(58) Field of Classification Search
CPC ...... G06N 3/063; G06N 3/0481; G06F 40/30; G06F 16/902; G06F 16/3326; G06F 16/94; G06F 16/3334; G06F 16/9535; G06K 9/72; G06K 9/00409; G06K 9/00463; G06K 9/6273; G06K 9/6255; G06K 9/00422; G06K 9/66; G06K 9/6268; G10L 15/1815; G10L 15/063; G10L 15/22; G10L 15/16; G10L 15/26
USPC .......................... 704/9, 11.001; 703/2; 706/27
See application file for complete search history.

(56) References Cited

U.S. PATENT DOCUMENTS

| | | |
|---|---|---|
| 2014/0236578 A1 | 8/2014 | Malon et al. |
| 2015/0142704 A1 | 5/2015 | London |
| 2016/0379108 A1* | 12/2016 | Chung ................. G06N 3/0454 706/27 |
| 2017/0061330 A1* | 3/2017 | Kurata ................... G06N 3/084 |
| 2017/0132496 A1* | 5/2017 | Shoaib ................... G06N 3/063 |
| 2018/0061439 A1* | 3/2018 | Diamos ................ G10L 15/063 |
| 2018/0137349 A1* | 5/2018 | Such .................... G06N 3/0445 |
| 2018/0268023 A1* | 9/2018 | Korpusik .............. G06N 5/022 |
| 2018/0329884 A1* | 11/2018 | Xiong ................. G06N 3/0445 |

OTHER PUBLICATIONS

Chen, Yahui, "Convolutional Neural Network for Sentence Classification", In Thesis presented to the University of Waterloo in fulfillment of the thesis requirement for the degree of Master of Mathematics in Computer Science, 2015, 62 Pages.

Chen, et al., "Event Extraction via Dynamic Multi-Pooling Convolutional Neural Networks", In Proceedings of the 53rd Annual Meeting of the Association for Computational Linguistics and the 7th International Joint Conference on Natural Language Processing, vol. 1, Jul. 26, 2015, pp. 167-176.

Gao, et al., "Modeling Interestingness with Deep Neural Networks", In Proceedings of Conference on Empirical Methods in Natural Language Processing, Oct. 25, 2014, pp. 2-13.

He, et al., "Multi-Perspective Sentence Similarity Modeling with Convolutional Neural Networks", In Proceedings of the Conference on Empirical Methods in Natural Language Processing, Sep. 17, 2015, pp. 1576-1586.

Hu, et al., "Convolutional Neural Network Architectures for Matching Natural Language Sentences", In Proceedings of the 27th International Conference on Neural Information Processing Systems, vol. 2, Dec. 8, 2014, pp. 1-9.

Kalchbrenner, et al., "A Convolutional Neural Network for Modelling Sentences", In Journal of Computing Research Repository, Apr. 8, 2014, 11 Pages.

Li, Hang, "Research on Deep Learning for Natural Language Processing at Huawei Noah's Ark Lab", Retrieved From: http://www.hangli-hl.com/uploads/3/4/4/6/34465961/polyu_hang_li.pdf, Jun. 3, 2015, 45 Pages.

Lowe, et al., "The Ubuntu Dialogue Corpus: A Large Dataset for Research in Unstructured Multi-Turn Dialogue Systems", In Journal of the Computing Research Repository, Jun. 30, 2015, 10 Pages.

Shen, et al., "Learning Semantic Representations Using Convolutional Neural Networks for Web Search", In Proceedings of the 23rd International Conference on World Wide Web, Apr. 7, 2014, pp. 373-374.

Sordoni, et al., "A Neural Network Approach to Context-Sensitive Generation of Conversational Responses", In Proceedings of the Conference of the North American Chapter of the Association for Computational Linguistics: Human Language Technologies, May 31, 2015, pp. 196-205.

Tymoshenko, et al., "Assessing the Impact of Syntactic and Semantic Structures for Answer Passages Reranking", In Proceedings of the 24th ACM International on Conference on Information and Knowledge Management, Oct. 19, 2015, pp. 1451-1460.

"First Office Action and Search Report Issued in Chinese Patent Application No. 201610534215.0", dated May 9, 2020, 12 Pages.

"Office Action Issued in European Patent Application No. 17740557.8", dated May 14, 2021, 7 Pages.

"Notice of Allowance Issued in Chinese Patent Application No. 201610534215.0", dated Feb. 4, 2021, 4 Pages.

* cited by examiner

CONVERSATIONAL RELEVANCE MODELING USING CONVOLUTIONAL NEURAL NETWORK

CROSS-REFERENCE TO RELATED APPLICATION

This application is a U.S. National Stage Application of PCT/US2017/040626, filed Jul. 4, 2017, which claims benefit of Chinese Patent Application No. 201610534215.0, filed Jul. 8, 2016, which applications are hereby incorporated by reference. To the extent appropriate, a claim of priority is made to each of the above disclosed applications.

BACKGROUND

To increase users' activity in conversation, the general conversation service needs to provide conversational relevant response, rather than the lexically relevant responses. Deep neural networks may be utilized to dimensionally model relevance of queries. As an example, a Convolutional Neural Network (CNN) model may be used to provide deep learning of training data to improve a system's ability to respond to queries. CNNs learn semantic features and assume those features are not restricted to absolute positions as they are presented. As related to natural language processing, features of a CNN model may be applied to evaluate different aspects related to an input such as part-of-speech tagging (POS), named entity recognition (NER) etc. A CNN model is typically formed by a stack of distinct layers that transform the input volume into an output volume (e.g. holding the class scores) through a differentiable function. While CNNs may provide deep learning for lexical evaluation of data, it is challenging to learn deep semantic knowledge from large amounts of conversation data and utilize the learned knowledge for automatic response selection for a query. For instance, consider a query of "what is the weather like if I want to go on a picnic in autumn?" A typical CNN model in evaluating semantic features of the query may break (into parts) the query such as 'what is the', 'the weather like', 'weather like if', 'like if I', 'I want to', etc. As can be seen, there is textual overlap in the textual parts that may affect an output (as determining what parts of most contextually relevance) as well as processing efficiency of the CNN model. As such, it is with respect to the general technical environment of improving CNN modeling for evaluate query/response pairs that the present application is directed.

SUMMARY

Non-limiting examples of the present disclosure describe a convolutional neural network (CNN) architecture that is configured to evaluate conversational relevance of query-response pairs. A CNN model is provided. The CNN model comprises: a first branch, a second branch, and multilayer perceptron (MLP) layers. The first branch comprises a plurality of convolutional layers with dynamic pooling to process a query. The second branch comprises a plurality of convolutional layers with dynamic pooling to process candidate responses for the query. The MLP layers are configured to rank query-response pairs based on conversational relevance. The query and the candidate responses are processed in parallel using the CNN model. Pairwise ranking of the query-response pairs are generated using the MLP layers based on a first input propagated from the first branch and second input propagated from the second branch. A ranking of one or more query-response pairs may be output.

In examples, the first branch may further comprise a word embedding layer that generates a sentence representation of the query, which is composed of a plurality of word embeddings (word vectors). An exemplary word embedding comprises a plurality of feature vectors, each mapped to a word of the query, that are used as feature input for CNN modeling of the query. The first branch executes processing to evaluate the meaning of the query by modeling the feature input to abstract meanings of the short text portions of the sentence representation using the plurality of convolutional layers. To improve CNN model processing, the first branch is configured to execute dynamic pooling processing operations that comprise: dividing a sentence representation of the query into at least two segments, evaluating redundant textual information in short text portions between the at least two segments of the query, and propagating non-redundant short text portions of the at least two segments for further processing. In examples, the first branch may further comprise a plurality of convolutional layers with k-max pooling. The previously stated further processing of the first branch may comprise propagating the non-redundant short text portions of the at least two segments for the query, to the plurality of convolutional layers with k-max pooling. Processing by the plurality of convolutional layers with k-max pooling results in the generation of the first input for the MLP layers to utilize in ranking of query-response pairs.

In examples, the second branch may further comprise a word embedding layer that generates a sentence representation of candidate responses, which are each composed of a plurality of word embeddings (word vectors) for a candidate response. An exemplary word embedding comprises a plurality of feature vectors, each mapped to a word of a candidate response, that are used as feature input for CNN modeling of a candidate response. The second branch executes processing to evaluate the meaning of the candidate response by modeling the feature input to abstract meanings of the short text portions of the sentence representation using the plurality of convolutional layers. To improve CNN model processing, the second branch is configured to execute dynamic pooling processing operations that comprise: dividing a sentence representation of the candidate response into at least two segments, evaluating redundant textual information in short text portions between the at least two segments of the candidate response, and propagating non-redundant short text portions of the at least two segments for further processing. In examples, the second branch may further comprise a plurality of convolutional layers with k-max pooling. The previously stated further processing of the second branch may comprise propagating the non-redundant short text portions of the at least two segments for the candidate response to the plurality of convolutional layers with k-max pooling. Processing by the plurality of convolutional layers with k-max pooling results in the generation of the second input for the MLP layers to utilize in ranking of query-response pairs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
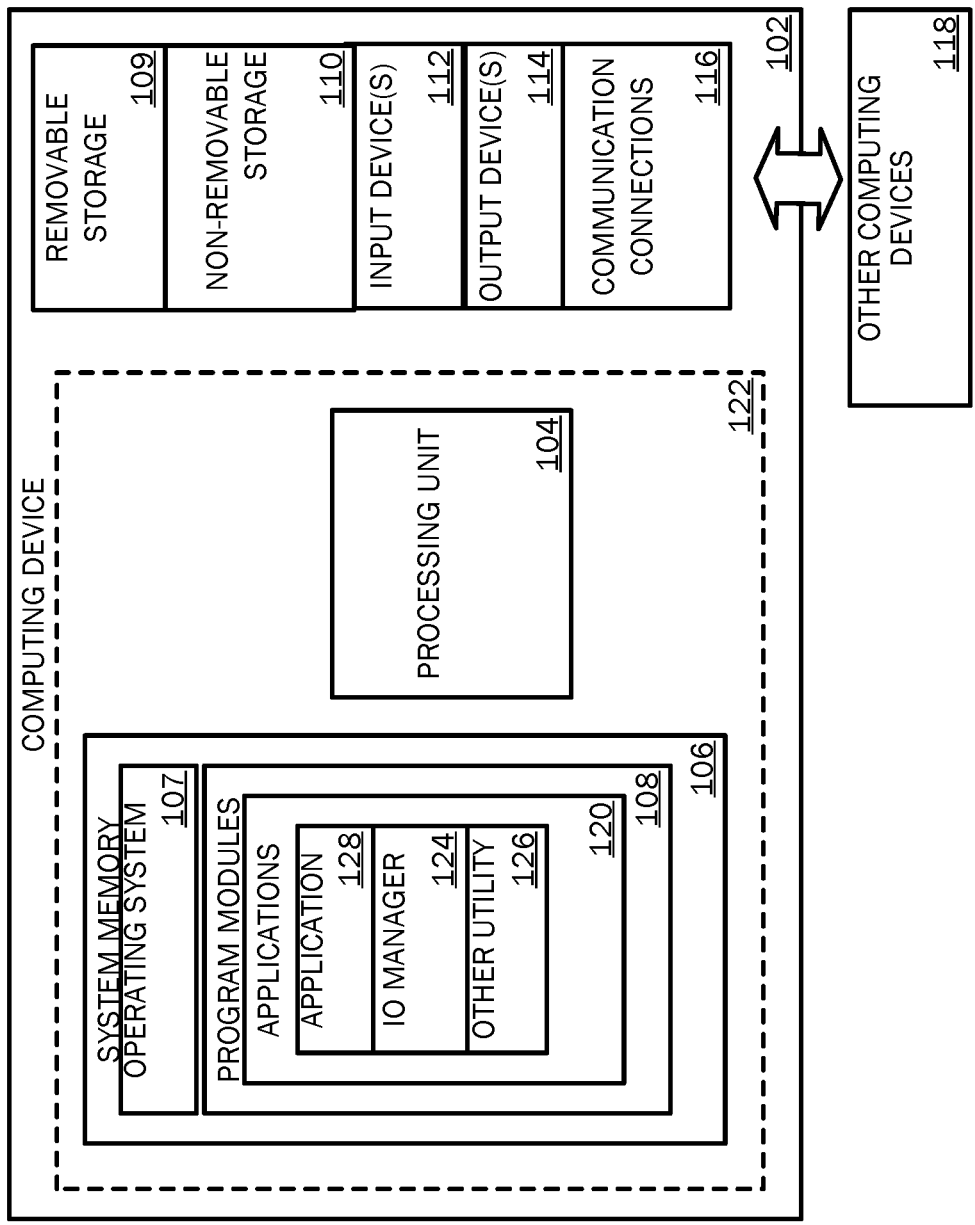
FIG. 1 is a block diagram illustrating an example of a computing device with which aspects of the present disclosure may be practiced.

Examples described herein relate to an exemplary Convolutional Neural Network (CNN) architecture that employs dynamic pooling processing operations to evaluate conversational relevance between text/phrases of query/response pairs. While examples described refer to query/response pair ranking, one skilled in the art should understand that processing operations described in the present disclosure may be applied to evaluate semantic features between any two types of data (e.g., 2 independent sentences). CNNs are typically very complex and require a large amount of resources to operate. Examples described herein generate a dynamic CNN model that outputs pairwise rankings for queries/responses, for example, based on conversational relevance. During processing, exemplary dynamic pooling processing operations are applied to eliminate redundant text information from affecting ranking of candidate responses for a query. As compared with CNN models that only employ k-max pooling functions, an exemplary dynamic pooling function described herein evaluates portions of text (e.g. n-grams, phrases, etc.) of a sentence relative to other portions of text of the sentence to filter the sentence for redundant text (e.g. overlap) between the portions of text. This enables the exemplary CNN model to propagate the most relevant portions of text for evaluation when executing pairwise ranking of a query to a candidate response, which improves processing efficiency of a CNN model. Processing operations describes herein may be configured to work with any type of CNN model to dynamically adapt the CNN model.

As describe herein, a Convolutional Neural Network (CNN) is adapted to model the query-response from users' conversations in applications/services such as conversational services, social networking services, and intelligent personal assistant services, among other examples. Queries and responses are mapped into a semantic space in parallel and independently, where inputs from independent processing of a query and candidate responses are combined at multilayer perceptron (MLP) layers configured to rank query-response pairs based on conversational relevance. Training of an exemplary CNN model builds a binary classifier or ranker that uses the semantic space to distinguish positive examples of query-response pairs that are conversationally relevant and negative examples of query-response pairs that are not conversationally relevant. The trained CNN model may be utilized to rank query/response pairs, for example, where the binary classifier applies learned parameters to model a query and candidate responses for conversational relevance. As described above, an exemplary CNN model utilizes dynamic pooling operations (e.g., execution of a dynamic pooling function) to explore valuable semantic features generated by convolutional operations. Experimental results using a social network service conversation dataset show that an exemplary adapted CNN model outperforms traditional CNN approaches with respect to ranking query/response pairs, without any prior knowledge or hand-annotating work.

Accordingly, the present disclosure provides a plurality of technical advantages including but not limited to: generation and management of an adapted CNN model that is tailored to evaluating semantic features (including hidden semantic features) associated with query/response pairs, improved query processing including ranking of query/response pairs, a CNN architecture that enables queries and response candidates to be mapped independently in a parallel manner, ability to train a CNN model to identify conversationally relevant query-response pairs, improved dynamic pooling operations that are incorporated to adapt a CNN architecture, more efficient operation of a processing device (e.g., saving computing cycles/computing resources) when utilizing a CNN to evaluate query/response pairs, extensibility to incorporate an exemplary CNN architecture into a variety of products and/or services, and improved user experience related to candidate response ranking according to a given query, among other examples.

Figure 2A:
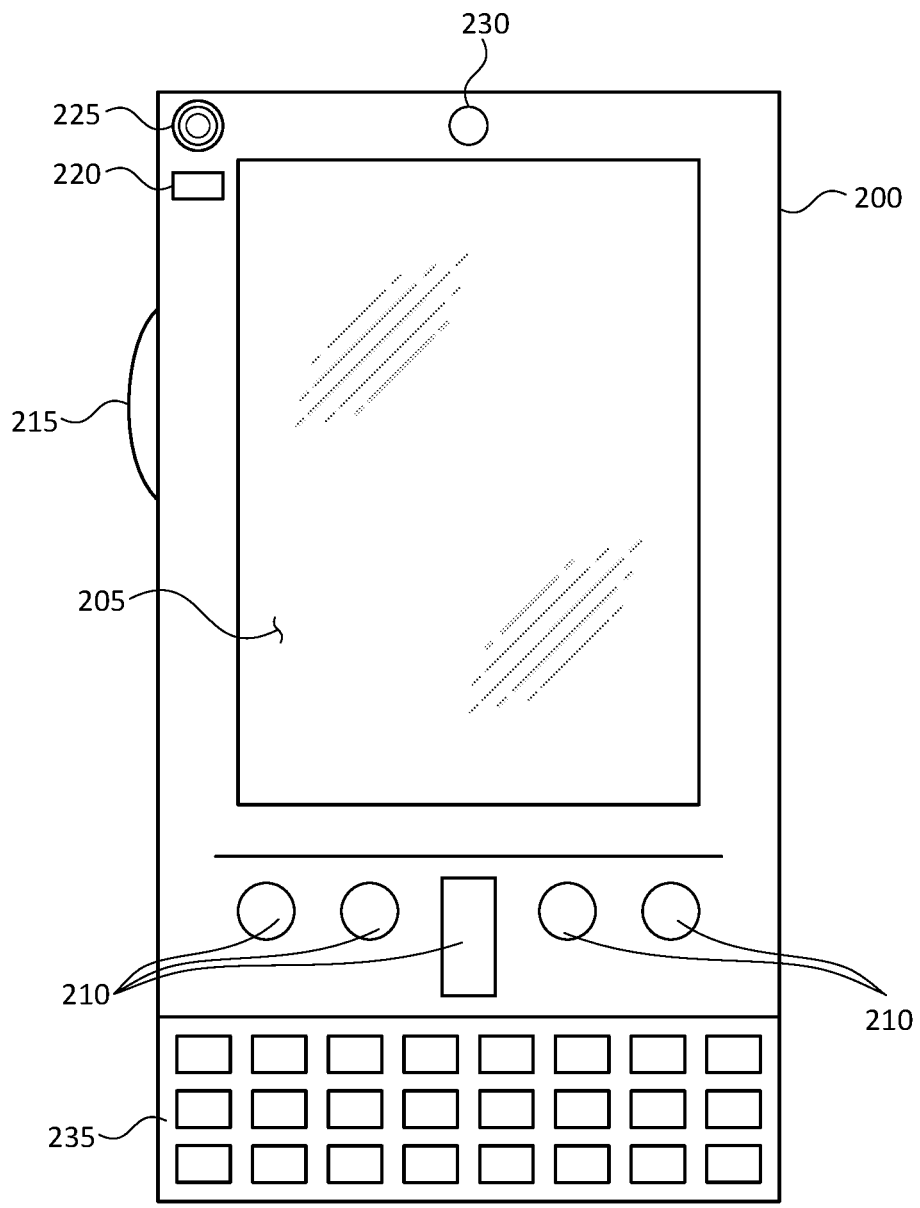
FIGS. 2A and 2B are simplified block diagrams of a mobile computing device with which aspects of the present disclosure may be practiced.
Figure 2B:
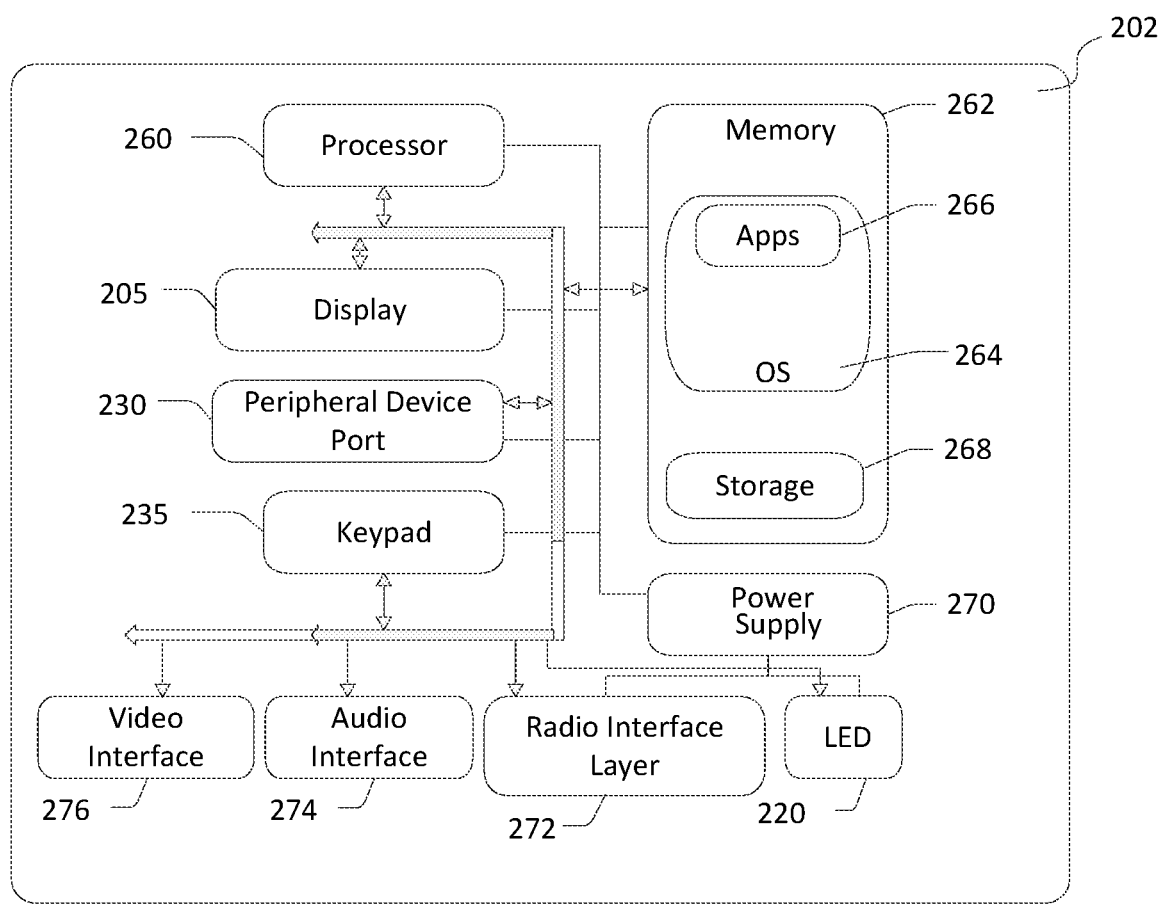
Figure 3:
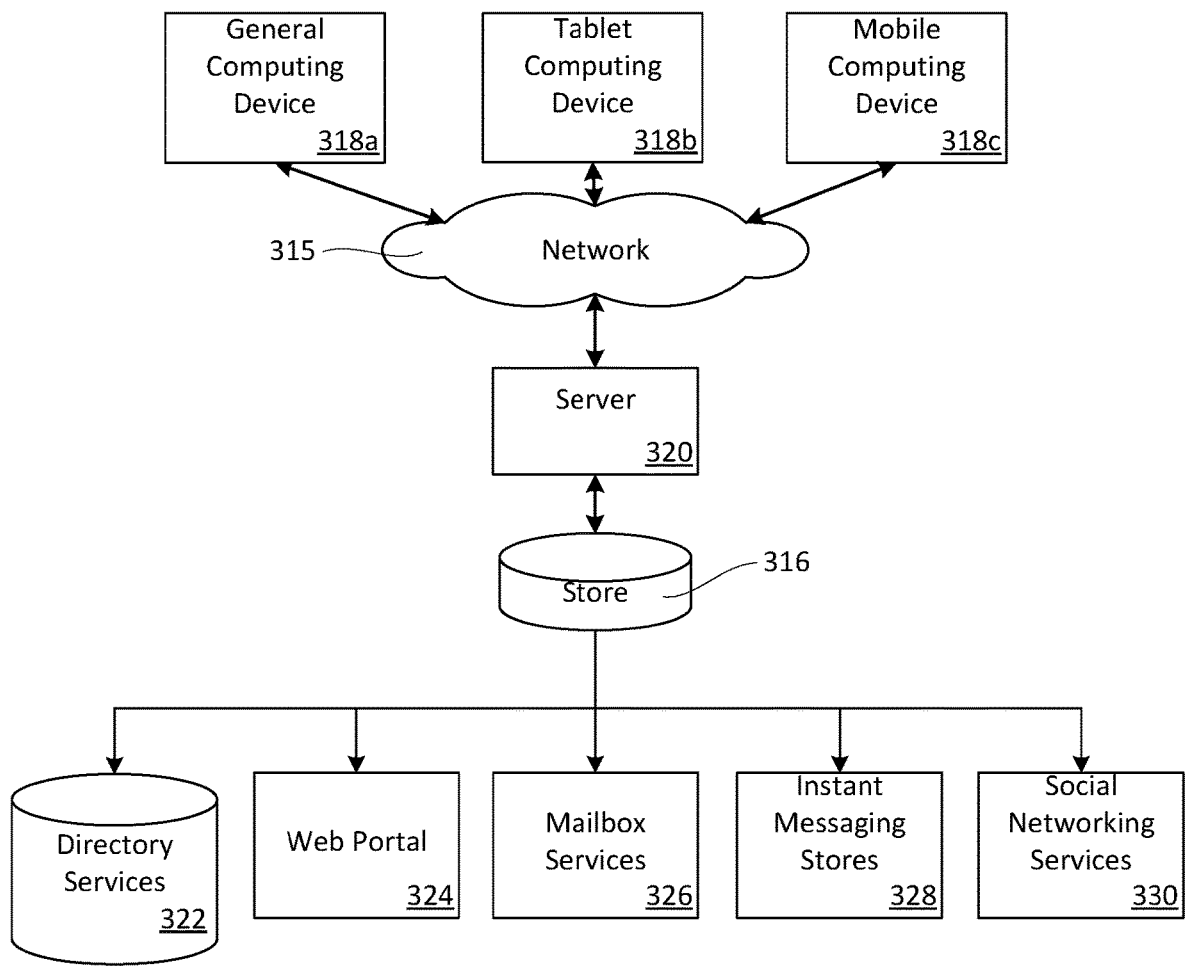
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of processing performed related to building, training and/or adapting a CNN architecture to evaluate data including query/response pairs. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 102 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for processing related to building, training and/or adapting a CNN architecture to evaluate data including query/response pairs. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system related to building, training and/or adapting a CNN architecture to evaluate data including query/response pairs. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
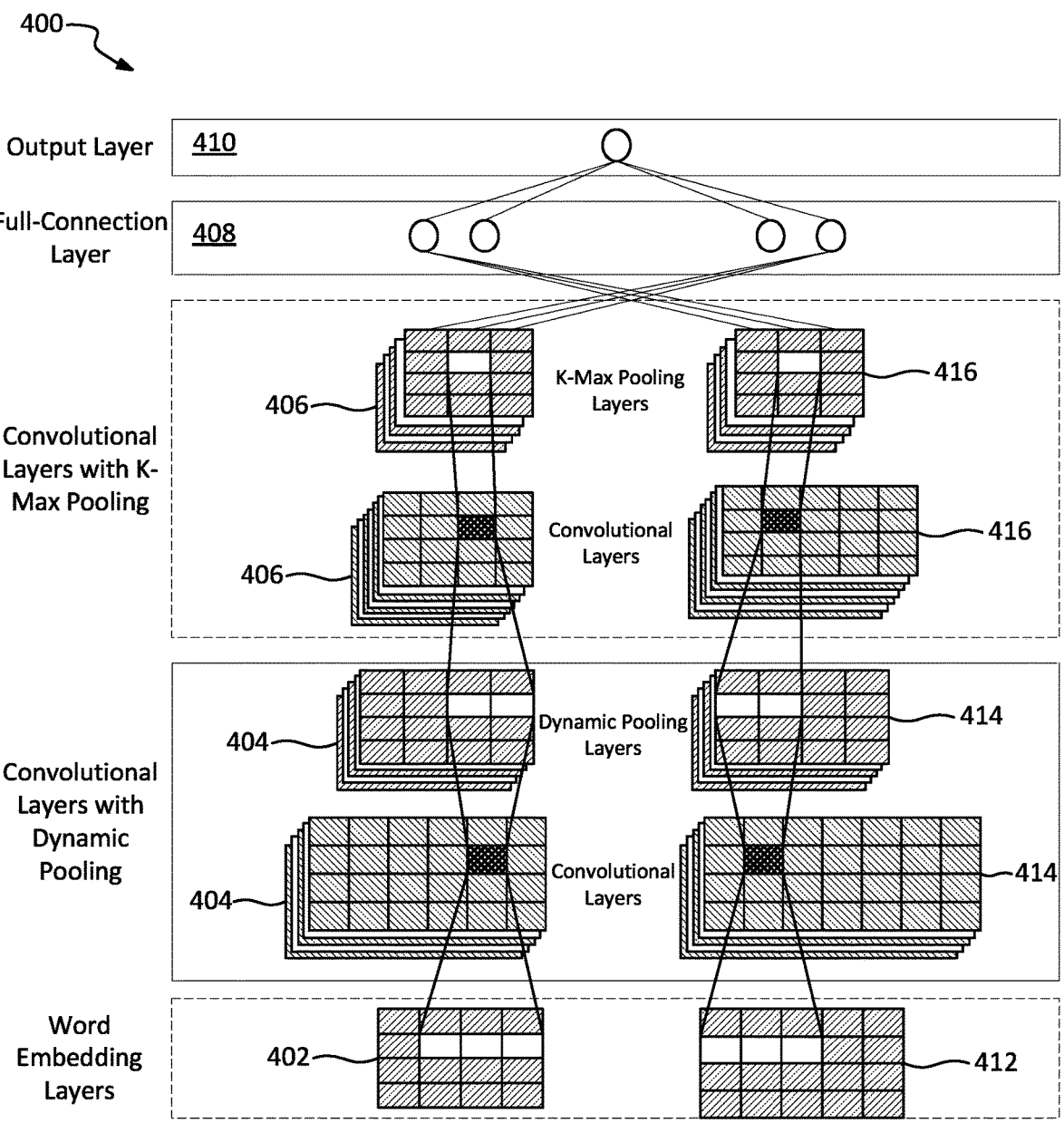
FIG. 4 illustrates an exemplary system implementable on one or more computing devices on which aspects of the present disclosure may be practiced.

FIG. 4 illustrates an exemplary system 400 implementable on one or more computing devices on which aspects of the present disclosure may be practiced. System 400 may be an exemplary system for processing related to building, training and/or adapting a CNN architecture to evaluate data including query/response pairs. Exemplary system 400 presented is a combination of interdependent components that interact to form an integrated whole for incorporation and application of a model that may be used independently model a query to response candidates in a parallel manner. Components of system 400 may be hardware components or software implemented on and/or executed by hardware components. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Furthermore, it is presented that application components of system 400 may interface with any of a plurality of application services. Application services may be any resource that may extend functionality of one or more components of system 400. Application services may include but are not limited to: operating system services, intelligent personal assistant services, web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 400.

Application services, interacting with components of system 400, may possess processing means and may be configured to handle any type of input including but not limited to speech/voice input, text input, gesture input, handwritten input, among other examples. That is, an exemplary CNN model may be associated with an application/service to process data from an application/service to not only train an exemplary CNN model but also execute query processing in real-time to assist an application/service with returning responses to received queries. For instance, an example application/service may be a social networking service (SNS) where query and response data of the SNS may be used to train a model of system 400. The trained model may be utilized to identify candidate responses that are most conversationally relevant (e.g., lead to more chatting rounds). In that example, the trained CNN model may be used to process queries received in the SNS or any other type of application/service. In one example, system 400 may interface with a chatbot application/service. A chatbot is conversational component designed to simulate an intelligent conversation with one or more users via auditory or textual methods. If a query is posed to a chatbot, a trained model of system 400 may be utilized to provide the chatbot with a ranking of query-response pairs to enable the chatbot to best respond to a user query.

System 400 may be scalable and configurable to operate on any of a variety of processing devices including but not limited to: desktop computers, laptop computers, mobile processing devices such as phones, tablets, slates, wearable processing devices (e.g., watches, glasses, earpieces etc.), vehicular processing devices, and any other devices having at least one processor, among other examples. As identified above, components of system 400 may be spread across multiple devices and connected through a distributed network environment. System 400 may be further connected, through the distributed network, to other processing devices that are executing applications/services.

System 400 may be trained to evaluate queries and candidate responses in real-time for ranking of query-response pairs according to conversational relevance. Training may comprise extracting queries and responses from applications services such as a social network service, among other examples. System 400 may process such extracted data to build an exemplary binary classifier that may be utilized to learn feature parameters for evaluating query-response pairs for testing and/or real-time processing. Training processing operations may be executed to identify parameters that may result in low error rates for identifying conversationally relevant responses for a query. Processing for training system 400 may be known to one skilled in the art. One skilled in the art understanding the present disclosure should understand that processing operations for training may vary with an objective to obtain a lowest error rate for identifying conversationally relevant query-response pairs.

Exemplary system 400 comprises stacks of layers that are configured to independently process a query and candidate responses in a parallel manner and combine results of that processing to rank query-response pairs for output. System 400 is an exemplary CNN architecture that comprises a first branch that comprises a plurality of layers utilized to evaluate a query. In one example, the first branch comprises: a word embedding layer 402, convolutional layers with dynamic pooling 404, and convolutional layers with k-max pooling 406. System 400 further comprises a second branch that comprises a plurality of layers utilized to evaluate candidate responses for the query. In one example, the second branch comprises: a word embedding layer 412, convolutional layers with dynamic pooling 414, and convolutional layers with k-max pooling 416. System 400 further comprises MLP layers configured to rank query-response pairs based on conversational relevance. The MLP layers comprise a full-connection layer 408 and an output layer 410, where the MLP layers map sets of input data received from the first and second branches onto a set of appropriate outputs. As an example, an output may be a ranked set of query-response pairs that an application/service may utilize to determine a response for a query. However, one skilled in the art should recognize that the exemplary CNN architecture described in system 400 may be configured to process and evaluate any aspect associated with data of queries and/or candidate responses. The two-branch architecture of system 400 provides the ability for the CNN to choose the useful information in judging query-response pairs. Exemplary processing operations described with respect to components of system 400 may be executable computer programs, application programming interfaces (APIs), or machine-learning processing, among other examples. For instance, machine learning processing operations may be applied to model queries with candidate response pairs where an output generated is a ranking of query-response pairs according to conversational relevance.

An exemplary word embedding layer 402 of the first branch of system 400 analyzes the text of a query. As an example, processing operations executed by the word embedding layer 402 takes a sentence representation of the query and maps each word of the query to a unique feature vector that is used to represent the meaning of the word when modeled using an exemplary CNN model of system 400. The feature vectors used for convolutional modeling may represent different evaluation aspects for the word including but not limited to: semantic meaning, part of speech, entity recognition, and location of the word in the sentence, among other examples. As an example a 4-dimensional embedding is used to represent a word of the sentence representation. However, one skilled in the art should understand that dimensional modeling may vary for word embedding. The output of the word embedding layer 402 is a word embedding that sequentially aligns the words of the sentence representation in an order that is consistent with the sentence representation of the query. The word embedding layer 402 propagates, for processing of the feature vectors, the word embedding to the convolutional layers with dynamic pooling 404.

The convolutional layers with dynamic pooling 404 model the feature input to abstract meanings of short text portions of a sentence representation of the query using a plurality of convolutional layers. The convolutional layers with dynamic pooling 404 comprise convolutional layers and dynamic pooling layers. For ease of understanding, description of layers 404 is broken down into convolutional layers (stacked on top of each other in FIG. 4) followed by dynamic pooling layers (stacked on top of each other in FIG. 4). Multiple stacked convolutional layers stacked before each pooling layer provides benefit to larger deeper networks because multiple stacked convolutional layers develop more complex features.

Convolutional processing operations executed in the convolutional layers of layers 404 may map the word embedding into a dimensional space to explore semantic features associated with the sentence representation of the query. A convolution layer consists of computation units, each of which responds to a small region of input. The aim of the convolutional layer is to extract patterns, i.e., discriminative word sequences found within the input sentences that are common throughout training instances. This assists in training a CNN model to recognize patterns that are useful when evaluating queries in real-time.

Convolutional layer parameters consist of a set of learnable filters. Each convolutional layer is an independent layer that applies one or more different dimensional filters to evaluate different aspects of the word embedding. For instance, the different convolutional layers may be considered as different language experts focused on different points of view when evaluating a semantic meaning of a word of the sentence representation. Filtering the word embedding using a plurality of convolutional layers can capture syntactic or semantic relations between non-continuous phrases that are far apart in an input sentence. As an example, each filter learns a feature map. Feature maps learned by different filters may be stacked along a depth dimension. In one example, parameter sharing may be employed to control the number of parameters used during modeling.

The sentence representation may be evaluated in small segments or portions. A convolutional layer applies a matrix-vector operation to a set window of size when evaluating the sentence representation. As an example, consider a query of "many people love going on a picnic in autumn because the weather is warm and dry." Processing operations that occur in the convolutional layers take the role of abstracting and understanding the meaning of phrases (e.g. combination of the words) with fixed a determined length. For instance, considering the example query above, convolutional processing may evaluate the above example query into small segments such as: 'Many people love', 'people love going', 'love going on', 'on picnic in', 'picnic in autumn', etc. Each convolutional layer may be configured to evaluate different aspects of the short text portions of the sentence representation. A plurality of short text portions of the sentence representation may be propagated for dynamic pooling processing. In one example, a one-dimensional wide convolution operation is performed, where different output feature maps provide various filtering weights to generate different local information combinations for the short text portions. Various potential features of the same phrase or sub-sentence are generated by multiple filters. Such features are screened by the higher level dynamic pooling layers of layers 404 to find significant hidden semantic of the short text portions.

The dynamic pooling layers of layers 404 are configured to down-sample the spatial dimensions of the input from convolutional processing. Dynamic pooling layers of layers 404 may be configured to filter the short text portions so that subsequent convolutional processing can more efficiently evaluate semantic meaning of a sentence representation. The dynamic pooling layers take the role of choosing or combining phrases to pass to subsequent processing layers. In doing so, the dynamic pooling layers evaluate results of convolutional layer processing, previously described. Processing operations applied in the dynamic pooling layers comprise: dividing a sentence representation of the query into at least two segments, evaluating redundant textual information in short text portions between the at least two segments, and propagating non-redundant short text portions of the at least two segments for further processing (e.g. to the convolutional layers with k-max pooling 406). Processing by the convolutional layers of layers 404 may determine the placement of a word and its importance to the sentence representation of the query, where the dynamic pooling layers may utilize such a determination to be able to filter short text portions of the sentence representation. Consider the query example described above where a plurality of short text portions are propagated to the dynamic pooling layers for a query of "many people love going on a picnic in autumn because the weather is warm and dry." Processing performed may identify one or more short text portions to propagate for each of the determined segments of the sentence representation, for example, where short text portions propagated to layers 406 may include 'many people love', going on', 'a picnic in', 'autumn because the' 'weather is', 'warm and dry', among other examples. In doing so, short text portions that comprise redundant/overlap text can be eliminated. Noticing that the combinations of some less important phrases can be also significant to the whole sentence meaning. In examples, dynamic pooling processing operations executed herein aim to obtain such useful combinations as well as most significant phrases by to enable pooling in $k$ small parts. The exemplary dynamic pooling operations assists the CNN model in keeping the sequence order instead of using a bag of word processing. This guarantees the ability to deal with variable length text, and contains more information for longer sentences. At the same time, the group pooling removes adjacent redundant information, making the model converge to the optimal solution much faster than traditional CNN models.

Consider an example where two convolutional layers are used in layers 404. An exemplary dynamic pooling function may be:

$$\max\left(ktop, \left\lceil \frac{L-l}{L} \right\rceil\right)$$

In this example architecture, L=2 since there are two convolution layers, resulting in half nodes being sampled after convolution combination in a subsequent dynamic pooling layer.

Processing may process to pass the propagated short text portions to the convolutional layers with k-max pooling 406. The convolutional layers with k-max pooling 406 may model the feature input to abstract meanings of short text portions of a sentence representation of the query using a plurality of convolutional layers. The convolutional layers with k-max pooling 406 comprise convolutional layers and k-max pooling layers. For ease of understanding, description of layers 406 is broken down into convolutional layers (stacked on top of each other in FIG. 4) followed by k-max pooling layers (stacked on top of each other in FIG. 4). The convolutional layers of layers 406 execute convolutional processing on the propagated short text portions. Examples of convolutional processing have been described previously (e.g. refer to description of convolutional layers with dynamic pooling 404). Such additional layers of convolutional processing may be utilized to further evaluate hidden semantic meaning between the propagated short text portions.

The k-max pooling layers are further pooling layers to down-sample the spatial dimensions of input before upper-layer processing (e.g., MLP layers). Dynamic k-max pooling is used to sample features proportional to its input size. K-max pooling operations are used to sample down different length vectors into the same length before inputs are passed to the full-connection layer. As opposed to extracting a single max value, k values are extracted in their original order. This allows for extracting several largest activation values from the input sentence. Data from the convolutional layers of layers 406 is passed to the k-max pooling layers, which are configured to learn an appropriate threshold to aggregate the propagated information and reduce the spatial representation. An exemplary dynamic k-max group pooling function chooses the important subsequence h from a sequence z as follows:

$$h_i(z) = \max_{j \in \left[i \times \frac{L}{k^2}(i+1) \times \frac{L}{k}\right]} \{z_j\},$$

$$j = 1, \ldots, k$$

where L stands for the element number of z and $h_i(z)$ denotes the i-th k-max group pooling output. Values are passed to the full-connection layer 408 of the MLP layers, which can be in correlation with values for candidate responses, to model query-response pairs.

As previously described, system 400 is configured to independently process, in parallel, a query and candidate responses. As shown in FIG. 4, system 400 further comprises a second branch that comprises a plurality of layers utilized to evaluate candidate responses for the query. In one example, the second branch comprises: a word embedding layer 412, convolutional layers with dynamic pooling 414, and convolutional layers with k-max pooling 416. Processing for such layers is the similar to that of the layers described in the first branch (query processing). For instance, the word embedding layer 412 performs processing operations similar to word embedding layer 402 but generates a word embedding for a candidate response. The convolutional layers with dynamic pooling 414 performs processing operations similar to convolutional layers with dynamic pooling 404 but model the word embedding of candidate responses and propagate short text portions for subsequent convolutional processing (e.g., convolutional layers with k-max pooling 416). The convolutional layers with k-max pooling 416 performs processing operations similar to convolutional layers with k-max pooling 408 but for evaluation of data associated with the propagated candidate responses.

MLP layers map sets of input data received from the first and second branches onto a set of appropriate outputs. As an example, an output may be a ranked set of query-response pairs that an application/service may utilize to determine a response for a query. Inputs data for the query (propagated from the first branch) and input data for candidate responses (propagated from the second branch) may be received at further processed by the full-connection layer 408.

The full-connection layer 408 is configured to model relationships between the query and the candidate responses. The full-connection layer 408 judges the conversational relevance of the query and the candidate responses by comparing interactions and sub-meanings between the query and each of the candidate responses. In doing so, the full-connection layer 408 applies machine learning processing operations to model input abstracted from each of the convolutional layers with k-max pooling 408 of the first branch and the convolutional layers with k-max pooling 416 of the second branch. In one example, scoring operations are applied to rank query-response pairs based on the modeling executed by the full-connection layer 408. For instance, a confident score may be generated to evaluate a sentence pair matching between a query and a candidate response. Processing operations applied in the full-connection layer 408 for evaluating and scoring query-response pairs are known to one skilled in the art.

The output layer 410 interfaces with the full-connection layer 408 to output a ranking for query-response pairs. For pairwise ranking models, the output layer provides a ranking score for each query-response pair. For classification models, by contrast, the output layer provides confidence scores of the query-response pair as conversationally relevance one or not. The output layer 410 represents class scores for ranked query response pairs. In examples, processing operations may be executed to interface with one or more applications/services to output the ranked query-response pairs, for example, using a distributed network. In one instance, a top ranked query-response pair may be transmitted to an application/service. However, any number of ranked query-response pairs may be output to applications/services.

Figure 5:
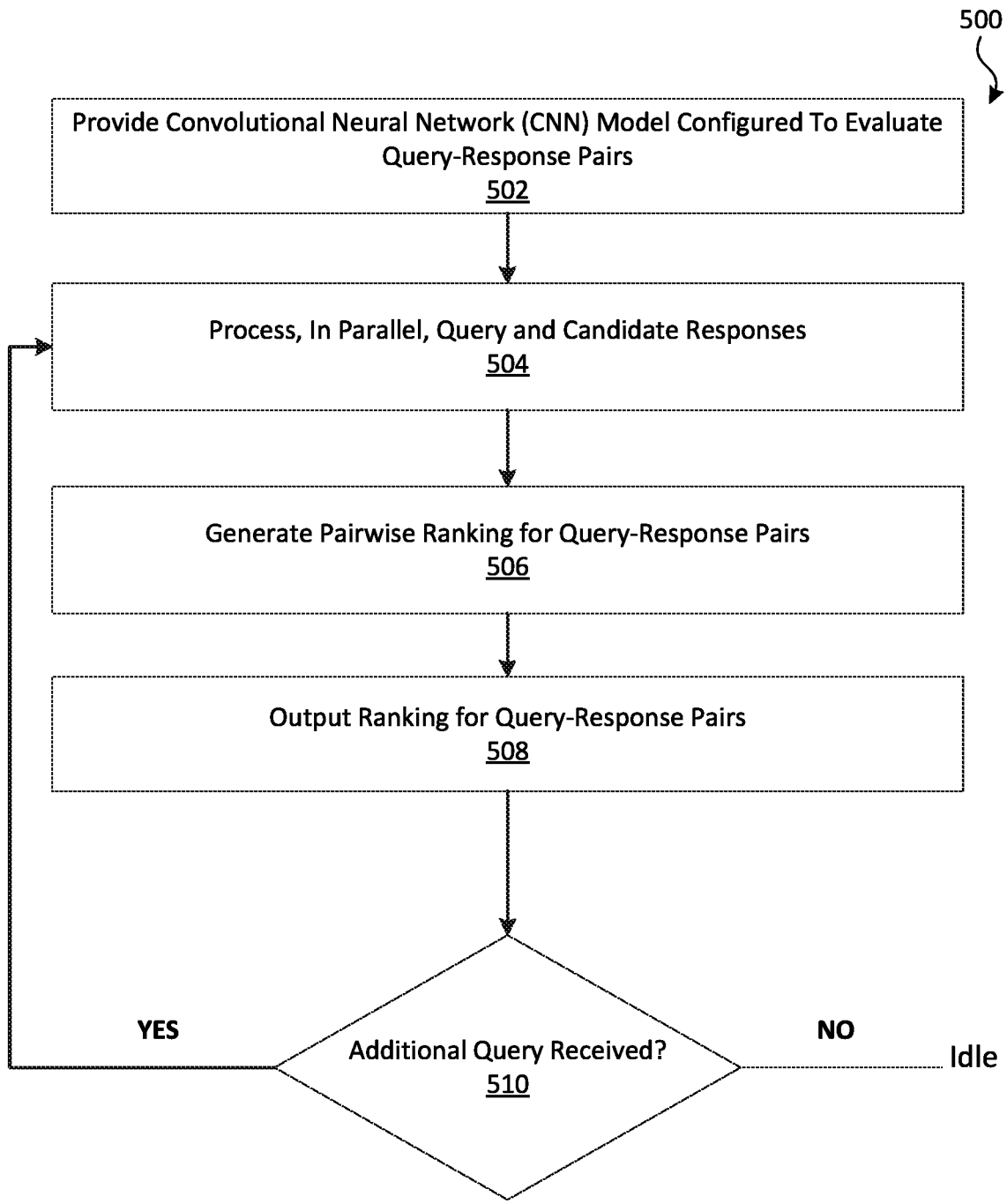
FIG. 5 is an exemplary method for applying an exemplary convolutional neural network model for query processing with which aspects of the present disclosure may be practiced.

FIG. 5 is an exemplary method 500 for applying an exemplary convolutional neural network model for query processing with which aspects of the present disclosure may be practiced. As an example, method 500 may be executed by an exemplary processing device and/or system such as those shown in FIGS. 1-4. In examples, method 500 may execute on a device comprising at least one processor configured to store and execute operations, programs or instructions. Operations performed in method 500 may correspond to operations executed by a system and/or service that execute computer programs, application programming interfaces (APIs), or machine-learning processing, among other examples. Adaptation of a CNN model including generation, training and testing of the CNN model may occur across a plurality of processing devices.

Method 500 begins at operation 502, where a CNN model is provided to evaluate query-response pairs. In one example, an exemplary CNN model is provided (operation 502) through a distributed network that is accessible by applications/services. For instance, an application/service may transmit data for a query and potential candidate responses for the CNN model to process and return a ranking of query-response pairs. In another example, providing (operation 502) of an exemplary CNN model comprises integrating the exemplary CNN model in a specific product or service. For instance, the CNN model may be associated with an application/service such as an intelligent personal assistant, chatbot application, social networking service, etc.

An exemplary CNN model is system 400 shown in FIG. 4 and described in the accompanying description of FIG. 4. An exemplary CNN model may be configured to apply processing operations to evaluate conversational relevance of candidate responses for a query. In doing so, processing operations, as previously described, are executed to evaluate semantic features of a query and candidate responses (in an independent manner).

An exemplary CNN model may include a first branch that comprises: a word embedding layer (for generation of a word embedding associated with a query), a plurality of convolutional layers with dynamic pooling to process the query, and a plurality of convolutional layers with k-max pooling to further process the query. The plurality of convolutional layers with dynamic pooling apply dynamic pooling processing operations that comprise: dividing a sentence representation of the query into at least two segments, evaluating redundant textual information in short text portions between the at least two segments, and propagating non-redundant short text portions of the at least two segments for further processing. Further processing may comprise modeling of the propagated non-redundant short text portions using a plurality of convolutional layers with k-max pooling. Using the plurality of convolutional layers with k-max pooling, the non-redundant short text portions of the at least two segments are further evaluated to propagate, as the first input for the MLP layers, a number of short text portions associated with each of the at least two segments of the query. In one example, the number of short text portions determined as first input for the MLP layers is determined based on a hyper-parameter set for k-max pooling.

The exemplary CNN model may further include a second branch that comprises: a word embedding layer (for generation of a word embedding associated with a candidate response), a plurality of convolutional layers with dynamic pooling to process the candidate responses, and a plurality of convolutional layers with k-max pooling to further process the candidate responses. The plurality of convolutional layers with dynamic pooling apply dynamic pooling processing operations that comprise: dividing a sentence representation of a candidate response into at least two segments, evaluating redundant textual information in short text portions between the at least two segments, and propagating non-redundant short text portions of the at least two segments for further processing. Further processing may comprise modeling of the propagated non-redundant short text portions using a plurality of convolutional layers with k-max pooling. Using the plurality of convolutional layers with k-max pooling, the non-redundant short text portions of the at least two segments are further evaluated to propagate, as the second input for the MLP layers, a number of short text portions associated with each of the at least two segments of the candidate response. In one example, the number of short text portions determined as second input for the MLP layers is determined based on a hyper-parameter set for k-max pooling.

Additionally, an exemplary CNN model may further comprise MLP layers that include a full-connection layer and an output layer. MLP layers of a CNN model are utilized to in order to aggregate input data from different branches of an exemplary CNN model, rank query-response pairs based on conversational relevance, and output one or more ranked query-response pairs.

Flow may proceed to operation 504, where the query and candidate responses are processed in parallel using an exemplary CNN model. Parallel processing applied in operation 504 may comprise executing CNN modeling of a query using the first branch and executing CNN modeling of candidate responses using the second branch. Inputs from each branch may be propagated to the MLP layers to rank query-response pairs.

Flow may proceed to operation 506, where a pairwise ranking of the query-response pairs is generated using the MLP layers. As previously described, the pairwise ranking may be generated (operation 506) based on first input propagated from the first branch and second input propagated from the second branch.

At operation 508, a ranking of one or more ranked query-response pairs may be output. As an example, a ranked query-response pair may be transmitted to an application/service, which may provide a response to the query to a computing device of a user. In another example, operation 508 may comprise transmitting the pairwise ranking of query-response pairs to an application/service, where the application/service may execute further processing to determine a response to provide for a query. In another example, outputting (operation 508) of a ranked query-response pair may comprise displaying a candidate response on one or more computing devices. In yet another example, output may be confidence scores relates to whether a candidate response is conversationally relevant for a given query.

Flow may proceed to decision operation 510, where it is determined whether a subsequent query is received. If not, flow branches NO and method 500 remains idle until a subsequent query is received. If a subsequent query is received, flow branches YES, and method 500 returns to operation 504, where the query and candidate responses are processed in parallel using an exemplary CNN model. Ranked query-response pairs for the subsequent query may be generated and output to provide conversationally relevant responses to queries.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

The invention claimed is:

1. A method comprising:
providing a convolutional neural network (CNN) model configured to evaluate conversational relevance of query-response pairs, wherein the CNN model comprises:
a first branch that comprises a plurality of convolutional layers with dynamic pooling to process a query,
a second branch that comprises a plurality of convolutional layers with dynamic pooling to process candidate responses for the query, and
multilayer perceptron (MLP) layers configured to rank query-response pairs based on conversational relevance;
processing, in parallel using the CNN model, the query and the candidate responses;
generating pairwise ranking of the query-response pairs using the MLP layers based on a first input propagated from the first branch and second input propagated from the second branch; and
outputting a ranking for one or more query-response pairs.

2. The method according to claim 1, wherein the dynamic pooling to process the query comprises executing, in the first branch, dynamic pooling processing operations that comprise: dividing a sentence representation of the query into at least two segments, evaluating redundant textual information in short text portions between the at least two segments, and propagating non-redundant short text portions of the at least two segments for further processing.

3. The method according to claim 2, wherein the first branch further comprises a plurality of convolutional layers with k-max pooling, and wherein the propagated non-redundant short text portions of the at least two segments are further evaluated using the plurality of convolutional layers with k-max pooling to propagate, as the first input for the MLP layers, a number of short text portions associated with each of the at least two segments.

4. The method according to claim 3, wherein the number of short text portions determined as input for the MLP layers is determined based on a hyper-parameter set for k-max pooling.

5. The method according to claim 2, wherein the first branch further comprises a word embedding layer that generates a word embedding for a sentence representation of the query, wherein the word embedding comprises a plurality of feature vectors, each mapped to a word of the query, that are used as feature input for modeling, and wherein the first branch executes processing to evaluate the meaning of the query by modeling the feature input to abstract meanings of the short text portions of the sentence representation using the plurality of convolutional layers.

6. The method according to claim 1, wherein the dynamic pooling to process the candidate responses comprises executing, in the second branch, dynamic pooling processing operations that comprise: dividing a sentence representation of a candidate response into at least two segments, evaluating redundant textual information in short text portions between the at least two segments, and propagating non-redundant short text portions of the at least two segments for further processing.

7. The method according to claim 6, wherein the second branch further comprises a plurality of convolutional layers with k-max pooling, and wherein the propagated non-redundant short text portions of the at least two segments for the candidate response are further evaluated using the plurality of convolutional layers with k-max pooling to propagate, as the second input for the MLP layers, a number of short text portions associated with each of the at least two segments for the candidate response.

8. The method according to claim 7, wherein the number of short text portions determined as input for the MLP layers is determined based on a hyper-parameter set for k-max pooling.

9. The method according to claim 6, wherein the second branch further comprises a word embedding layer that generates a word embedding for a sentence representation of the candidate response, wherein the word embedding comprises a plurality of feature vectors, each mapped to a word of the candidate response, that are used as feature input for modeling, and wherein the second branch executes processing to evaluate the meaning of the candidate response by modeling the feature input to abstract meanings of the short text portions of the sentence representation for the candidate response using the plurality of convolutional layers.

10. A system comprising:
at least one processor; and
a memory operatively connected with the at least one processor storing computer-executable instructions that, when executed by the at least one processor, causes the at least one processor to execute a method that comprises:
providing a convolutional neural network (CNN) model configured to evaluate conversational relevance of query-response pairs, wherein the CNN model comprises:
a first branch that executes processing operations to: evaluate the meaning of a query by modeling feature input to abstract meanings of short text portions of a sentence representation of the query using a plurality of convolutional layers, and execute dynamic pooling processing operations that comprise: dividing a sentence representation of the query into at least two segments, evaluating redundant textual information in short text portions between the at least two segments of the query, and propagating non-redundant short text portions of the at least two segments for further processing,
a second branch that executes processing operations to: evaluate the meaning of candidate responses by modeling feature input to abstract meanings of short text portions of a sentence representation of a candidate response using a plurality of convolutional layers, and execute dynamic pooling processing operations that comprise: dividing a sentence representation of the candidate response into at least two segments, evaluating redundant textual information in short text portions between the at least two segments of the candidate response, and propagating non-redundant short text portions of the at least two segments of the candidate response for further processing, and multilayer perceptron (MLP) layers configured to rank query-response pairs based on conversational relevance;

processing, in parallel using the CNN model, the query and the candidate responses;

generating pairwise ranking of the query-response pairs using the MLP layers based on a first input propagated from the first branch and second input propagated from the second branch; and outputting one or more ranked query-response pairs.

11. The system of claim 10, wherein the first branch further comprises a plurality of convolutional layers with k-max pooling, and wherein the propagated non-redundant short text portions of the at least two segments are further evaluated using the plurality of convolutional layers with k-max pooling to propagate, as the first input for the MLP layers, a number of short text portions associated with each of the at least two segments.

12. The system of claim 11, wherein the number of short text portions determined as input for the MLP layers is determined based on a hyper-parameter set for k-max pooling.

13. The system of claim 10, wherein the first branch further comprises a word embedding layer that generates a word embedding for a sentence representation of the query, wherein the word embedding comprises a plurality of feature vectors, each mapped to a word of the query, that are used as feature input for modeling, and wherein the first branch executes processing to evaluate the meaning of the query by modeling the feature input to abstract meanings of the short text portions of the sentence representation using the plurality of convolutional layers.

14. The system of claim 10, wherein the second branch further comprises a plurality of convolutional layers with k-max pooling, and wherein the propagated non-redundant short text portions of the at least two segments for the candidate response are further evaluated using the plurality of convolutional layers with k-max pooling to propagate, as the second input for the MLP layers, a number of short text portions associated with each of the at least two segments for the candidate response.

15. The system of claim 14, wherein the number of short text portions determined as input for the MLP layers is determined based on a hyper-parameter set for k-max pooling.

16. A computer storage media having computer readable instructions stored thereupon which, when executed by a computing device, cause the computing device to perform operations comprising:

providing a convolutional neural network (CNN) model configured to evaluate conversational relevance of query-response pairs, wherein the CNN model comprises:

a first branch that comprises a plurality of convolutional layers with dynamic pooling to process a query, a second branch that comprises a plurality of convolutional layers with dynamic pooling to process candidate responses for the query, and multilayer perceptron (MLP) layers configured to rank query-response pairs based on conversational relevance;

processing, in parallel using the CNN model, the query and the candidate responses;

generating pairwise ranking of the query-response pairs using the MLP layers based on a first input propagated from the first branch and second input propagated from the second branch; and outputting a ranking for one or more query-response pairs.

17. The computer storage media of claim 16, wherein the dynamic pooling to process the query comprises executing, in the first branch, dynamic pooling processing operations that comprise: dividing a sentence representation of the query into at least two segments, evaluating redundant textual information in short text portions between the at least two segments, and propagating non-redundant short text portions of the at least two segments for further processing.

18. The computer storage media of claim 17, wherein the first branch further comprises a plurality of convolutional layers with k-max pooling, and wherein the propagated non-redundant short text portions of the at least two segments are further evaluated using the plurality of convolutional layers with k-max pooling to propagate, as the first input for the MLP layers, a number of short text portions associated with each of the at least two segments.

19. The computer storage media of claim 18, wherein the number of short text portions determined as input for the MLP layers is determined based on a hyper-parameter set for k-max pooling.

20. The computer storage media of claim 17, wherein the first branch further comprises a word embedding layer that generates a word embedding for a sentence representation of the query, wherein the word embedding comprises a plurality of feature vectors, each mapped to a word of the query, that are used as feature input for modeling, and wherein the first branch executes processing to evaluate the meaning of the query by modeling the feature input to abstract meanings of the short text portions of the sentence representation using the plurality of convolutional layers.

* * * * *